E. L. RUSSELL.
VALVE.
APPLICATION FILED AUG. 21, 1911. RENEWED FEB. 8, 1915.
1,153,708.
Patented Sept. 14, 1915.
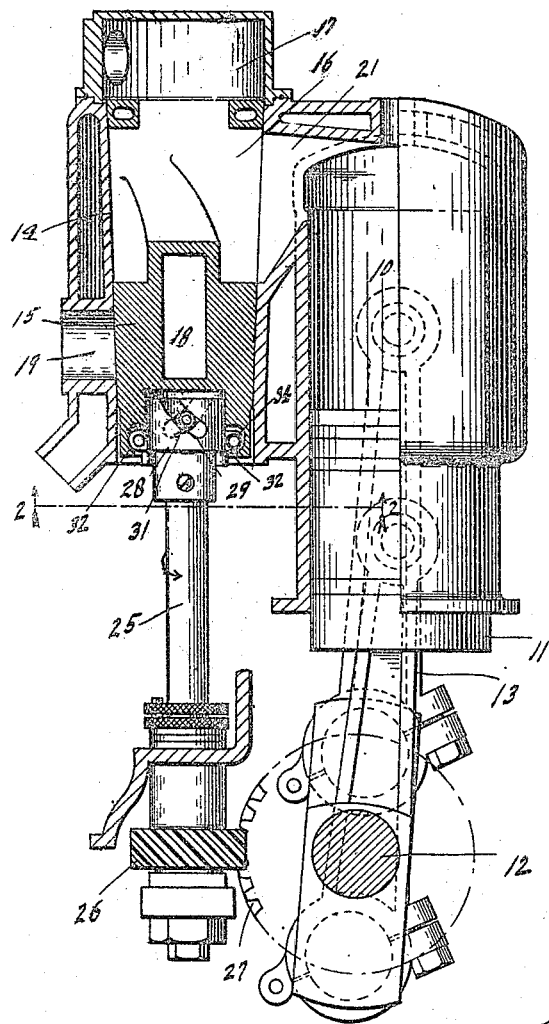
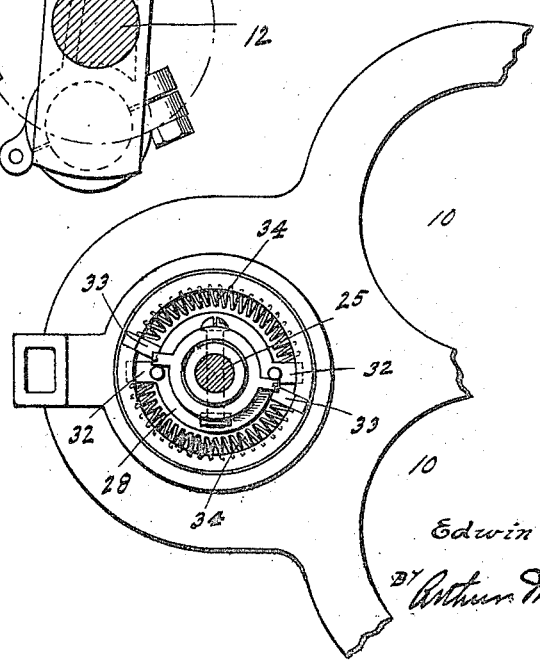

UNITED STATES PATENT OFFICE.

EDWIN L. RUSSELL, OF CLEVELAND, OHIO.

VALVE.

1,153,708.  Specification of Letters Patent.  Patented Sept. 14, 1915.

Application filed August 21, 1911, Serial No. 645,224. Renewed February 8, 1915. Serial No. 6,803.

*To all whom it may concern:*

Be it known that I, EDWIN L. RUSSELL, a citizen of the United States, residing at Cleveland, in the county of Cuyahoga and State of Ohio, have invented a new and useful Valve, of which the following is a specification.

It has heretofore been proposed to provide a rotary valve structure for controlling the induction and eduction of gases and fuel in an internal combustion engine but, so far as I am aware, such structures have not proven to be practical and satisfactory because, if the valve be made of sufficient diameter to provide large enough port areas, the expansion and contraction due to excessive and unavoidable changes in temperature, is so great as to cause such leakage as to make the device practically inoperative.

One of the objects of my present invention is, therefore to produce a rotary valve structure especially designed for gas engine purposes, its construction, more especially its connection with a driving member, being such that variations in diameter, due either to wear or to changes in temperature, or variations due to changes in lubrication or otherwise, normally tending to vary the fit relation of the valve to its seat or to vary its resistance to movement along its seat, will be automatically compensated.

The accompanying drawings illustrate my invention.

Figure 1 is a vertical section of a gas engine provided with my improved valve and Fig. 2 a section on line 2—2 of Fig. 1 on a larger scale.

In the drawings, 10 indicates the cylinder or combustion chamber of an internal combustion engine, 11 the piston, 12 the crank shaft and 13 the connecting pitman, all of any desired construction. Communicating with the combustion chamber 10 is a valve chamber 14 in which is mounted a rotary valve 15. This valve, in the form shown in the present drawings, is provided with an inlet passage 16 which is always in communication with the inlet chamber 17, and with an exhaust passage 18 for intermittently registering with the exhaust passage 19 of the valve chamber. Both the inlet and exhaust passages 16 and 18 register intermittently and alternately with the combined inlet and exhaust passage 21 leading from the valve chamber into the cylinder. It will be noted that, in the form shown in the drawings, the valve has a diameter practically equal to the diameter of the cylinder and as a consequence very large port areas and passages may be obtained. If an attempt be made to drive such a valve by ordinary means it will be found that, if the valve were tight when cold it would be so tight when hot, after the engine had been in operation for a few moments, that it could not be moved and if sufficient allowance were made to permit the operation of the valve when hot it would be impossible to obtain proper compressions in the cylinder when the engine was cold. In order to avoid this difficulty therefore and at the same time maintain the valve always at or in its seat with a substantially uniform pressure which is not great enough to interfere with its operation, I have provided the following mechanism: The driving shaft 25 of the valve is connected in any suitable manner, as by gears 26 and 27, with the crank shaft and is held against axial movement. At its upper end shaft 25 is provided with a head 28 provided with diametrically opposed angularly arranged cam slots 29 which are, in effect, a quick pitch screw thread. Projected into these cam slots from the valve 15 are one or more suitable projections, such as two pins 31, (only one being shown). Head 28 is provided with a pair of diametrically opposed and radially extending lugs 32, 32 and between these lugs and corresponding pins 33, 33 carried by the valve, I mount compression springs 34, 34 which springs tend to drive the valve in the direction of rotation of shaft 25. Valve 15 by this arrangement becomes movable not only along its seat (*i. e.* rotatively) but also becomes movable away from its seat (*i. e.* axially) in the form illustrated, and the force which tends to drive the valve along its seat is primarily transmitted to the valve through the springs 34. If the resistance of the valve to movement along its seat is for any cause greater than it should be, either by reason of expansion of the valve within its seat, or lack of lubrication, carbonization or otherwise, springs 34 will be compressed by an initial independent forward movement of shaft 25 and would thus exert a somewhat greater driving force upon the valve. At the same time the initial independent advancement of the shaft 25 will shift cam slots 29 with relation to pins 31 and will thus drive the valve axially or away from its seat temporarily thus insuring a sufficient diminution of its resistance to forward movement to permit such forward movement. As soon as the valve has started in its forward movement its resistance to such forward movement will decrease and springs 34 will thus automatically forward the valve and hold it to its seat with the desired tension of springs 34 so as to maintain a proper joint.

It will be noted that, in the form shown, the connection between shaft 25 and valve 15 is such that there can be no axial movement of the valve away from its seat except by a relative rotative movement between the shaft and valve and consequently pressures from the combustion chamber acting upon the valve cannot tend to blow it from its seat.

I claim as my invention:

1. In an internal combustion engine, the combination with the combustion chamber, piston and shaft connected therewith, of a circular valve chamber communicating with the combustion chamber, a valve rotatably mounted in said valve chamber and controlling the communication between the valve chamber and combustion chamber, a valve driver connected with said shaft, and a connection between said driver and valve permitting relative rotation and, upon relative rotation only, causing axial shifting of the valve toward or from its seat.

2. In an internal combustion engine, the combination with the combustion chamber, piston and shaft connected therewith, of a valve chamber having a seated communication with the combustion chamber, a valve seated therein and movable both along and away from said seat, a valve driver connected with the shaft, and a yielding connection between said driver and valve such that abnormal resistance of the valve to movement along its seat will cause initial movement of the valve away from its seat.

3. In an internal combustion engine, the combination with the combustion chamber, piston and shaft connected therewith, of a valve chamber having a seated communication with the combustion chamber, a valve seated therein and movable both along and away from said seat, a valve driver connected with the shaft, and a yielding connection between said driver and valve such that only abnormal resistance of the valve to movement along its seat will cause initial movement of the valve away from its seat.

4. In an internal combustion engine, the combination with the combustion chamber, piston and shaft connected therewith, of a tubular tapered valve chamber having a seated communication with the combustion chamber, a tapered rotary valve driver connected with the shaft, a rotatable screw driving connection between the driver and valve whereby rotative advancement of the driver independent of rotative advancement of the valve will move the valve axially away from its seat, and means urging the valve to its seat.

5. In an internal combustion engine, the combination with the combustion chamber, piston and shaft connected therewith, of a tubular tapered valve chamber having a seated communication with the combustion chamber, a tapered rotary valve driver connected with the shaft, a rotatable screw driving connection between the driver and valve whereby rotative advancement of the driver independent of rotative advancement of the valve will move the valve axially away from its seat, and a spring driving connection between the driver and valve urging the valve forward rotatively.

In witness whereof, I have hereunto set my hand and seal at Indianapolis, Indiana, this 16th day of August, A. D. one thousand nine hundred and eleven.

EDWIN L. RUSSELL. [L. S.]

Witnesses:
FRANK A. FAHLE,
G. B. SCHLEY.

Copies of this patent may be obtained for five cents each, by addressing the "Commissioner of Patents, Washington, D. C."